US009544937B2

(12) United States Patent
Su et al.

(10) Patent No.: US 9,544,937 B2
(45) Date of Patent: Jan. 10, 2017

(54) PERFORMING DATA COMMUNICATION USING A FIRST RAT WHILE PERFORMING A VOICE CALL USING A SECOND RAT

(71) Applicant: Apple Inc., Cupertino, CA (US)

(72) Inventors: Li Su, San Jose, CA (US); Jianxiong Shi, Dublin, CA (US)

(73) Assignee: Apple Inc., Cupertino, CA (US)

(*) Notice: Subject to any disclaimer, the term of this patent is extended or adjusted under 35 U.S.C. 154(b) by 8 days.

(21) Appl. No.: 14/227,673

(22) Filed: Mar. 27, 2014

(65) Prior Publication Data

US 2015/0282237 A1 Oct. 1, 2015

(51) Int. Cl.
*H04M 1/00* (2006.01)
*H04W 76/02* (2009.01)
*H04W 88/06* (2009.01)

(52) U.S. Cl.
CPC ......... *H04W 76/025* (2013.01); *H04W 76/026* (2013.01); *H04W 88/06* (2013.01)

(58) Field of Classification Search
USPC .................................................... 455/552.1
See application file for complete search history.

(56) References Cited

U.S. PATENT DOCUMENTS

| 9,246,655 | B2* | 1/2016 | Olsson ............... H04W 36/0022 |
| 9,252,936 | B2* | 2/2016 | Olsson ............... H04W 36/0022 |
| 2002/0105923 | A1* | 8/2002 | Nikides et al. ............... 370/329 |
| 2002/0118784 | A1* | 8/2002 | Teo et al. ....................... 375/349 |
| 2010/0197272 | A1 | 8/2010 | Karaoguz et al. |
| 2011/0134908 | A1* | 6/2011 | Almalki et al. ............... 370/352 |
| 2011/0149925 | A1* | 6/2011 | Olsson et al. ................. 370/337 |
| 2012/0002545 | A1* | 1/2012 | Watfa et al. ................... 370/235 |
| 2012/0039167 | A1 | 2/2012 | Swaminathan et al. |
| 2012/0257494 | A1* | 10/2012 | Chin et al. ..................... 370/221 |
| 2012/0258707 | A1* | 10/2012 | Mathias ................ H04W 36/30 455/426.1 |

(Continued)

FOREIGN PATENT DOCUMENTS

| JP | 2007096923 A | 4/2007 |
| JP | 2013058827 A | 3/2013 |
| WO | 2013166119 A2 | 11/2013 |

OTHER PUBLICATIONS

Japanese Office Action, Application No. 2015-037045, mailed Mar. 25, 2016, 8 pages.

*Primary Examiner* — German J Viana Di Prisco
(74) *Attorney, Agent, or Firm* — Meyertons Hood Kivlin Kowert & Goetzel, P.C.; Jeffrey C. Hood; Joel L. Stevens (57) ABSTRACT

Performing data communication using a first radio access technology (RAT) while performing a voice call using a second RAT, using a first radio (e.g., a single radio for cellular communication. The UE may use the first radio to initially perform first data communication using the first RAT. During the first data communication the UE may not be communicating using the second RAT or may not generally maintain a connection to the second RAT. Subsequently, the UE may receive an indication to perform at least one of a mobile originated voice call or receive a mobile terminated voice call using the second RAT. Accordingly, the UE may perform the voice call using the second RAT in response to the indication, using the first radio. Additionally, the UE may perform second data communication using the first RAT during the voice call, using the first radio.

18 Claims, 7 Drawing Sheets

(56) References Cited

U.S. PATENT DOCUMENTS

2013/0201890 A1   8/2013  Swaminathan et al.
2013/0203385 A1*  8/2013  Wei et al. ..................... 455/411
2013/0215869 A1   8/2013  Srinivasan et al.
2014/0010170 A1*  1/2014  Das et al. ..................... 370/329
2014/0071951 A1   3/2014  Liu et al.

* cited by examiner

PERFORMING DATA COMMUNICATION USING A FIRST RAT WHILE PERFORMING A VOICE CALL USING A SECOND RAT

FIELD OF THE INVENTION

The present application relates to wireless devices, and more particularly to a system and method for providing improved performance and/or reduced power consumption in wireless devices that support multiple radio access technologies (RATs).

DESCRIPTION OF THE RELATED ART

Wireless communication systems are rapidly growing in usage. Further, wireless communication technology has evolved from voice-only communications to also include the transmission of data, such as Internet and multimedia content. Therefore, improvements are desired in wireless communication. In particular, the large amount of functionality present in a user equipment (UE), e.g., a wireless device such as a cellular phone, can place a significant strain on the battery life of the UE. Further, where a UE is configured to support multiple radio access technologies (RATs), certain performance degradations can occur on one or more of the RATs, such as due to tune-away operations of the other RAT. As a result, techniques are desired which provide power savings and/or improved performance in such wireless UE devices.

New and improved cellular radio access technologies (RATs) are sometimes deployed in addition to existing RATs. For example, networks implementing Long Term Evolution (LTE) technology, developed and standardized by the Third Generation Partnership Project (3GPP), are currently being deployed. LTE and other newer RATs often support faster data rates than networks utilizing legacy RATs, such as various second generation (2G) and third generation (3G) RATs.

However, in some deployments, LTE and other new RATs may not fully support some services that can be handled by legacy networks. Accordingly, LTE networks are often co-deployed in overlapping regions with legacy networks and UE devices may transition between RATs as services or coverage may require. For example, in some deployments, LTE networks are not capable of supporting voice calls. Thus, for example when a UE device receives or initiates a circuit switched voice call while connected to an LTE network that does not support voice calls, the UE device can transition to a legacy network, such as one which uses a GSM (Global System for Mobile Communications) RAT or a "1x" (Code Division Multiple Access 2000 (CDMA2000) 1x) RAT that supports voice calls, among other possibilities.

Some UE devices use a single radio to support operation on multiple cellular RATs. For example, some UE devices use a single radio to support operation on both LTE and GSM networks. The use of a single radio for multiple RATs makes transitioning between networks, such as in response to a page message for an incoming voice call or circuit switched service, more complex. In addition, the use of a single radio for multiple RATs presents certain power usage and performance issues.

For example, in such systems the UE may periodically tune from the first network, using a more advanced RAT, to the second network, using a legacy RAT, e.g., to listen to a paging channel for a voice call. However, such tune-away operations from a more advanced RAT, such as LTE, to a legacy RAT, such as GSM, can result in increased power consumption and/or performance degradation of the LTE network.

Therefore, it would be desirable to provide improved performance and power consumption in wireless communication systems where a UE devices use a single radio to support operation on multiple cellular RATs.

SUMMARY OF THE INVENTION

Embodiments described herein relate to a User Equipment (UE) device and associated method performing data communication using a first radio access technology (RAT) while performing a voice call using a second RAT. The UE may include a first radio (e.g., may have a single radio for cellular communication) for performing both the data communication of the first RAT and the voice call of the second RAT. In one embodiment, the UE may use a single SIM for the first RAT and the second RAT.

The UE may use the first radio to initially perform first data communication using the first RAT. During the first data communication the UE may not be communicating using the second RAT or may not generally maintain a connection to the second RAT. Subsequently, the UE may receive an indication to perform at least one of a mobile originated voice call or receive a mobile terminated voice call using the second RAT. Accordingly, the UE may perform the voice call using the second RAT in response to the indication, using the first radio. Additionally, the UE may perform second data communication using the first RAT during the voice call, using the first radio.

This Summary is provided for purposes of summarizing some exemplary embodiments to provide a basic understanding of aspects of the subject matter described herein. Accordingly, the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present invention can be obtained when the following detailed description of the embodiments is considered in conjunction with the following drawings.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Acronyms

The following acronyms are used in the present disclosure.
3GPP: Third Generation Partnership Project
3GPP2: Third Generation Partnership Project 2
GSM: Global System for Mobile Communications
UMTS: Universal Mobile Telecommunications System
LTE: Long Term Evolution
RAT: Radio Access Technology
TX: Transmit
RX: Receive Terms The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, other handheld devices, as well as wearable devices such as wrist-watches, headphones, pendants, earpieces, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 1:
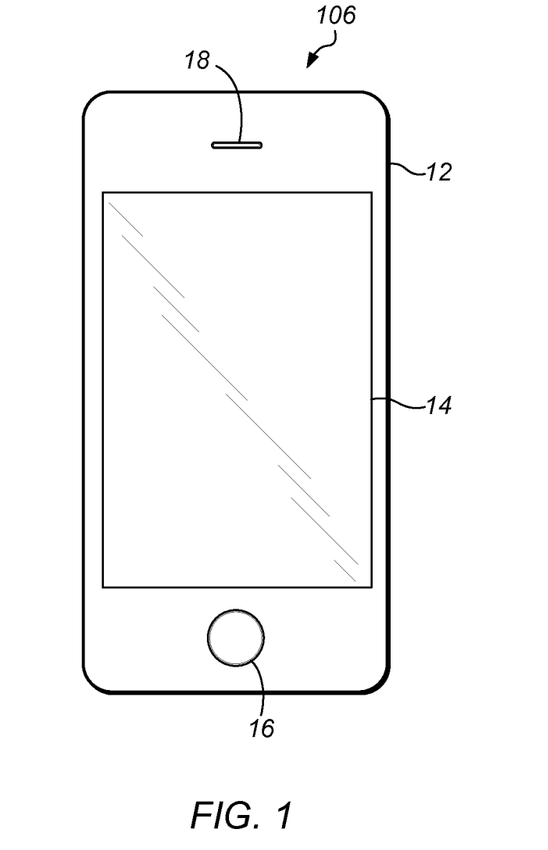
FIG. 1 illustrates an example user equipment (UE) according to one embodiment.

FIG. 1—User Equipment

FIG. 1 illustrates an example user equipment (UE) 106 according to one embodiment. The term UE 106 may be any of various devices as defined above. UE device 106 may include a housing 12 which may be constructed from any of various materials. UE 106 may have a display 14, which may be a touch screen that incorporates capacitive touch electrodes. Display 14 may be based on any of various display technologies. The housing 12 of the UE 106 may contain or comprise openings for any of various elements, such as home button 16, speaker port 18, and other elements (not shown), such as microphone, data port, and possibly various other types of buttons, e.g., volume buttons, ringer button, etc.

The UE 106 may support multiple radio access technologies (RATs). For example, UE 106 may be configured to communicate using any of various RATs such as two or more of Global System for Mobile Communications (GSM), Universal Mobile Telecommunications System (UMTS), Code Division Multiple Access (CDMA) (e.g., CDMA2000 1×RTT or other CDMA radio access technologies), Long Term Evolution (LTE), Advanced LTE, and/or other RATs. For example, the UE 106 may support at least two radio access technologies such as LTE and GSM. Various different or other RATs may be supported as desired.

The UE 106 may comprise one or more antennas. The UE 106 may also comprise any of various radio configurations, such as various combinations of one or more transmitter chains (TX chains) and one or more receiver chains (RX chains). For example, the UE 106 may comprise a radio that supports two or more RATs. The radio may comprise a single TX (transmit) chain and a single RX (receive) chain. Alternatively, the radio may comprise a single TX chain and two RX chains that operate on the same frequency. In another embodiment, the UE 106 comprises two or more radios, i.e., two or more TX/RX chains (two or more TX chains and two or more RX chains).

In the embodiment described herein, the UE 106 comprises two antennas which communicate using two or more RATs. For example, the UE 106 may have a pair of cellular telephone antennas coupled to a single radio or shared radio. The antennas may be coupled to the shared radio (shared wireless communication circuitry) using switching circuits and other radio-frequency front-end circuitry. For example, the UE 106 may have a first antenna that is coupled to a transceiver or radio, i.e., a first antenna that is coupled to a transmitter chain (TX chain) for transmission and which is coupled to a first receiver chain (RX chain) for receiving. The UE 106 may also comprise a second antenna that is coupled to a second RX chain. The first and second receiver chains may share a common local oscillator, which means that both of the first and second receiver chains tune to the same frequency. The first and second receiver chains may be referred to as the primary receiver chain (PRX) and the diversity receiver chain (DRX).

In one embodiment, the PRX and DRX receiver chains operate as a pair and time multiplex among two or more RATs, such as LTE and one or more other RATs such as GSM or CDMA1×. In the primary embodiment described herein the UE 106 comprises one transmitter chain and two receiver chains (PRX and DRX), wherein the transmitter chain and the two receiver chains (acting as a pair) time multiplex between two (or more) RATs, such as LTE and GSM.

Each antenna may receive a wide range of frequencies such as from 600 MHz up to 3 GHz. Thus, for example, the local oscillator of the PRX and DRX receiver chains may tune to a specific frequency such as an LTE frequency band, where the PRX receiver chain receives samples from antenna 1 and the DRX receiver chain receives samples from antenna 2, both on the same frequency (since they use the same local oscillator). The wireless circuitry in the UE 106 can be configured in real time depending on the desired mode of operation for the UE 106. In the example embodiment described herein, the UE 106 is configured to support LTE and GSM radio access technologies.

Figure 2:
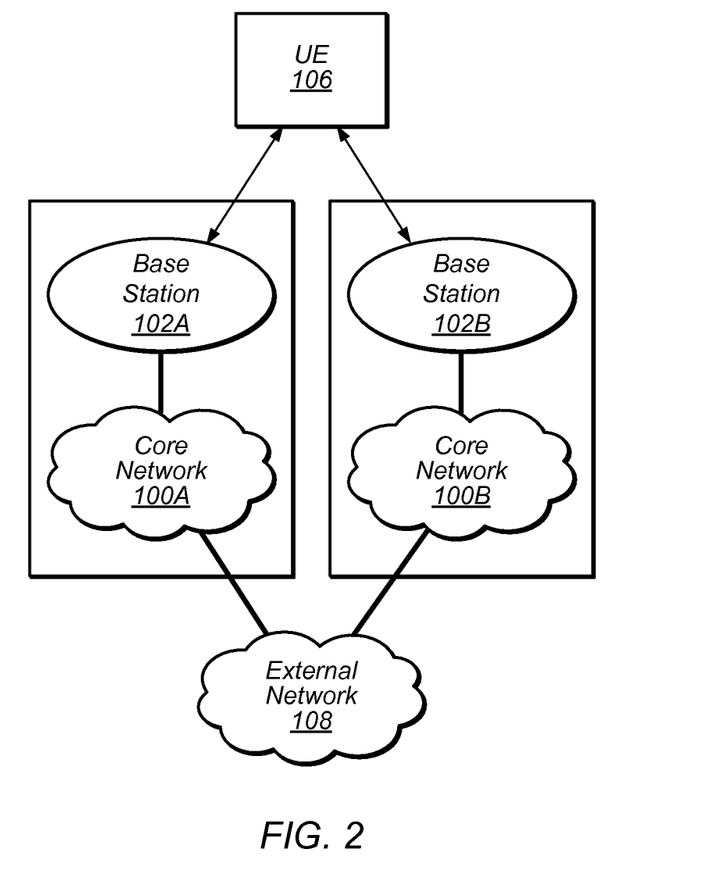
FIG. 2 illustrates an example wireless communication system where a UE communicates with two base stations using two different RATs.

FIG. 2—Communication System

FIG. 2 illustrates an exemplary (and simplified) wireless communication system. It is noted that the system of FIG. 2 is merely one example of a possible system, and embodiments may be implemented in any of various systems, as desired.

As shown, the exemplary wireless communication system includes base stations 102A and 102B which communicate over a transmission medium with one or more user equipment (UE) devices, represented as UE 106. The base stations 102 may be base transceiver stations (BTS) or cell sites, and may include hardware that enables wireless communication with the UE 106. Each base station 102 may also be equipped to communicate with a core network 100. For example, base station 102A may be coupled to core network 100A, while base station 102B may be coupled to core network 100B. Each core network may be operated by a respective cellular service provider, or the plurality of core networks 100A may be operated by the same cellular service provider. Each core network 100 may also be coupled to one or more external networks (such as external network 108), which may include the Internet, a Public Switched Telephone Network (PSTN), and/or any other network. Thus, the base stations 102 may facilitate communication between the UE devices 106 and/or between the UE devices 106 and the networks 100A, 100B, and 108.

The base stations 102 and the UEs 106 may be configured to communicate over the transmission medium using any of various radio access technologies ("RATs", also referred to as wireless communication technologies or telecommunication standards), such as GSM, UMTS (WCDMA), LTE, LTE Advanced (LTE-A), 3GPP2 CDMA2000 (e.g., 1×RTT, 1×EV-DO, HRPD, eHRPD), IEEE 802.11 (WLAN or Wi-Fi), IEEE 802.16 (WiMAX), etc.

Base station 102A and core network 100A may operate according to a first RAT (e.g., LTE) while base station 102B and core network 100B may operate according to a second (e.g., different) RAT (e.g., GSM, CDMA 2000 or other legacy or circuit switched technologies). The two networks may be controlled by the same network operator (e.g., cellular service provider or "carrier"), or by different network operators, as desired. In addition, the two networks may be operated independently of one another (e.g., if they operate according to different RATs), or may be operated in a somewhat coupled or tightly coupled manner.

Note also that while two different networks may be used to support two different RATs, such as illustrated in the exemplary network configuration shown in FIG. 2, other network configurations implementing multiple RATs are also possible. As one example, base stations 102A and 102B might operate according to different RATs but couple to the same core network. As another example, multi-mode base stations capable of simultaneously supporting different RATs (e.g., LTE and GSM, LTE and CDMA2000 1×RTT, and/or any other combination of RATs) might be coupled to a core network that also supports the different cellular communication technologies. In one embodiment, the UE 106 may be configured to use a first RAT that is a packetswitched technology (e.g., LTE) and a second RAT that is a circuit-switched technology (e.g., GSM or 1×RTT).

As discussed above, UE 106 may be capable of communicating using multiple RATs, such as those within 3GPP, 3GPP2, or any desired cellular standards. The UE 106 might also be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of network communication standards are also possible.

Base stations 102A and 102B and other base stations operating according to the same or different RATs or cellular communication standards may thus be provided as a network of cells, which may provide continuous or nearly continuous overlapping service to UE 106 and similar devices over a wide geographic area via one or more radio access technologies (RATs).

Figure 3:
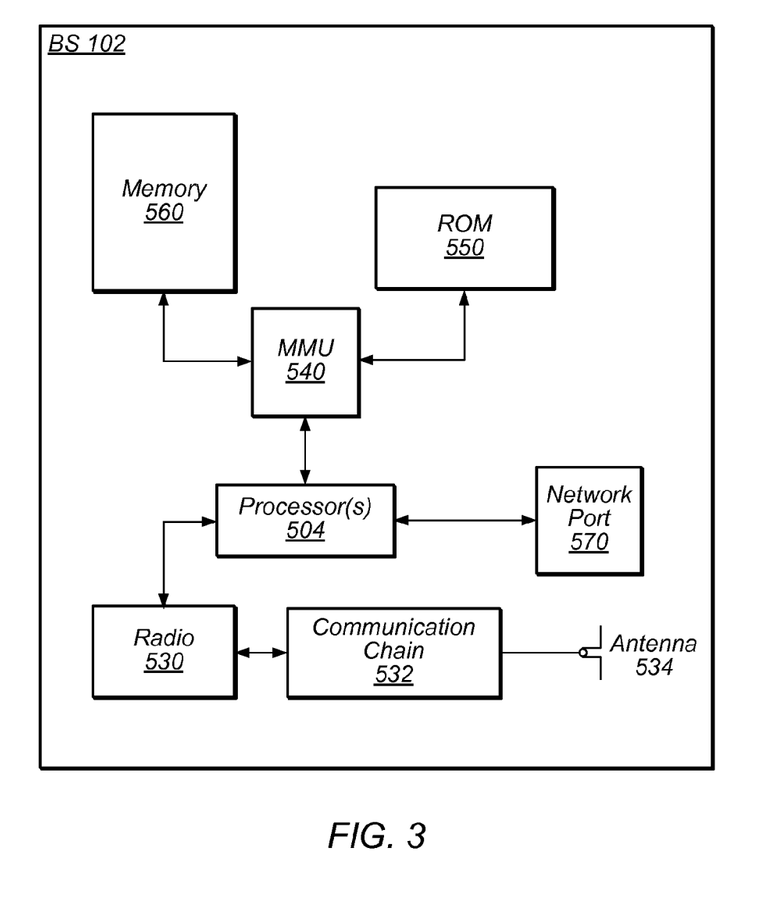
FIG. 3 is an example block diagram of a base station, according to one embodiment.

FIG. 3—Base Station

FIG. 3 illustrates an exemplary block diagram of a base station 102. It is noted that the base station of FIG. 3 is merely one example of a possible base station. As shown, the base station 102 may include processor(s) 504 which may execute program instructions for the base station 102. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The base station 102 may include at least one network port 570. The network port 570 may be configured to couple to a telephone network and provide a plurality of devices, such as UE devices 106, access to the telephone network as described above.

The network port 570 (or an additional network port) may also or alternatively be configured to couple to a cellular network, e.g., a core network of a cellular service provider. The core network may provide mobility related services and/or other services to a plurality of devices, such as UE devices 106. In some cases, the network port 570 may couple to a telephone network via the core network, and/or the core network may provide a telephone network (e.g., among other UE devices 106 serviced by the cellular service provider).

The base station 102 may include at least one antenna 534. The at least one antenna 534 may be configured to operate as a wireless transceiver and may be further configured to communicate with UE devices 106 via radio 530. The antenna 534 communicates with the radio 530 via communication chain 532. Communication chain 532 may be a receive chain, a transmit chain or both. The radio 530 may be configured to communicate via various RATs, including, but not limited to, LTE, GSM, WCDMA, CDMA2000, etc.

The processor(s) 504 of the base station 102 may be configured to implement part or all of the methods described herein, e.g., by executing program instructions stored on a memory medium (e.g., a non-transitory computer-readable memory medium). Alternatively, the processor 504 may be configured as a programmable hardware element, such as an FPGA (Field Programmable Gate Array), or as an ASIC (Application Specific Integrated Circuit), or a combination thereof.

Figure 4:
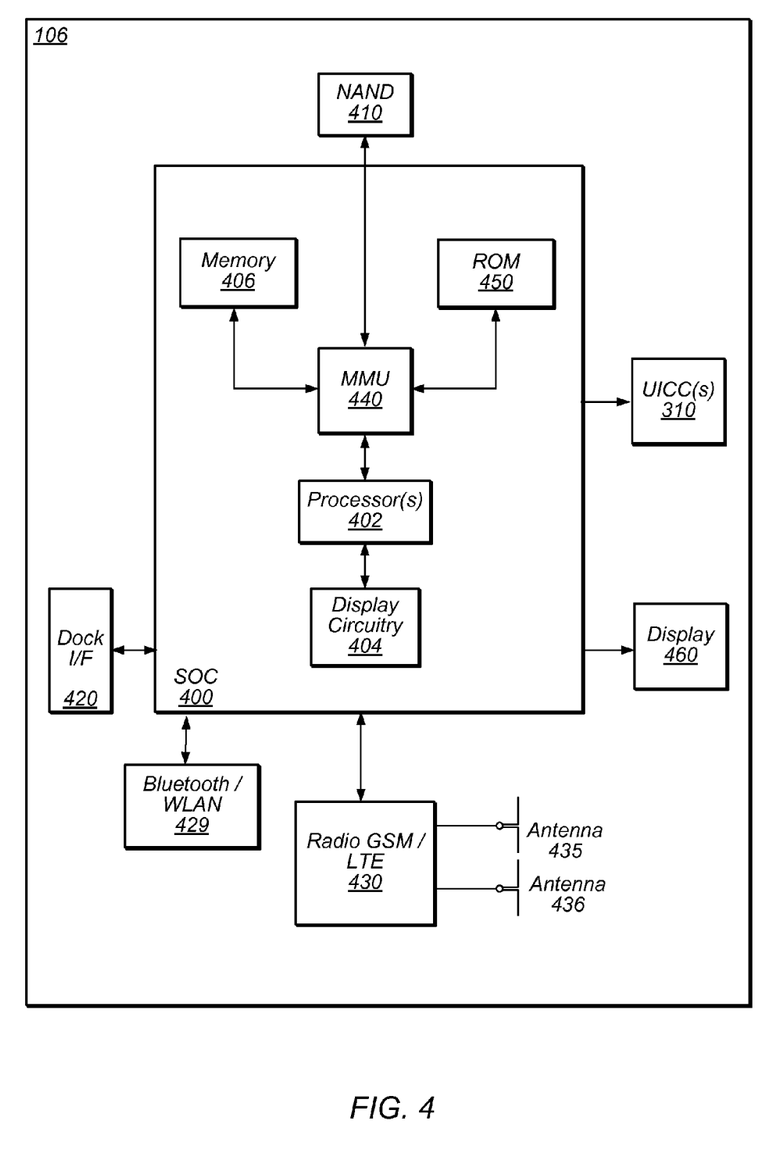
FIG. 4 is an example block diagram of a UE, according to one embodiment.

FIG. 4—User Equipment (UE)

FIG. 4 illustrates an example simplified block diagram of a UE 106. As shown, the UE 106 may include a system on chip (SOC) 400, which may include portions for various purposes. The SOC 400 may be coupled to various other circuits of the UE 106. For example, the UE 106 may include various types of memory (e.g., including NAND flash 410), a connector interface 420 (e.g., for coupling to a computer system, dock, charging station, etc.), the display 460, cellular communication circuitry 430 such as for LTE, GSM, etc., and short range wireless communication circuitry 429 (e.g., Bluetooth and WLAN circuitry). The UE 106 may further comprise one or more smart cards 310 that comprise SIM (Subscriber Identity Module) functionality, such as one or more UICC(s) (Universal Integrated Circuit Card(s)) cards 310. The cellular communication circuitry 430 may couple to one or more antennas, preferably two antennas 435 and 436 as shown. The short range wireless communication circuitry 429 may also couple to one or both of the antennas 435 and 436 (this connectivity is not shown for ease of illustration).

As shown, the SOC 400 may include processor(s) 402 which may execute program instructions for the UE 106 and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, cellular communication circuitry 430, short range wireless communication circuitry 429, connector I/F 420, and/or display 460. The MMU 440 may be configured to perform memory protection and page table translation or set up. In some embodiments, the MMU 440 may be included as a portion of the processor(s) 402.

In one embodiment, as noted above, the UE 106 comprises at least one smart card 310, such as a UICC 310, which executes one or more Subscriber Identity Module (SIM) applications and/or otherwise implement SIM functionality. The at least one smart card 310 may be only a single smart card 310, or the UE 106 may comprise two or more smart cards 310. Each smart card 310 may be embedded, e.g., may be soldered onto a circuit board in the UE 106, or each smart card 310 may be implemented as a removable smart card. Thus the smart card(s) 310 may be one or more removable smart cards (such as UICC cards, which are sometimes referred to as "SIM cards"), and/or the smart card(s) 310 may be one or more embedded cards (such as embedded UICCs (eUICCs), which are sometimes referred to as "eSIMs" or "eSIM cards"). In some embodiments (such as when the smart card(s) 310 include an eUICC), one or more of the smart card(s) 310 may implement embedded SIM (eSIM) functionality; in such an embodiment, a single one of the smart card(s) 310 may execute multiple SIM applications. Each of the smart card(s) 310 may include components such as a processor and a memory; instructions for performing SIM/eSIM functionality may be stored in the memory and executed by the processor. In one embodiment, the UE 106 may comprise a combination of removable smart cards and fixed/non-removable smart cards (such as one or more eUICC cards that implement eSIM functionality), as desired. For example, the UE 106 may comprise two embedded smart cards 310, two removable smart cards 310, or a combination of one embedded smart card 310 and one removable smart card 310. Various other SIM configurations are also contemplated.

As noted above, in one embodiment, the UE 106 comprises two or more smart cards 310, each implementing SIM functionality. The inclusion of two or more SIM smart cards 310 in the UE 106 may allow the UE 106 to support two different telephone numbers and may allow the UE 106 to communicate on corresponding two or more respective networks. For example, a first smart card 310 may comprise SIM functionality to support a first RAT such as LTE, and a second smart card 310 may comprise SIM functionality to support a second RAT such as GSM. Other implementations and RATs are of course possible. Where the UE 106 comprises two smart cards 310, the UE 106 may support Dual SIM Dual Active (DSDA) functionality. The DSDA functionality may allow the UE 106 to be simultaneously connected to two networks (and use two different RATs) at the same time. The DSDA functionality may also allow the UE 106 may to simultaneously receive voice calls or data traffic on either phone number. In another embodiment, the UE 106 supports Dual SIM Dual Standby (DSDS) functionality. The DSDS functionality may allow either of the two smart cards 310 in the UE 106 to be on standby waiting for a voice call and/or data connection. In DSDS, when a call/data is established on one SIM 310, the other SIM 310 is no longer active. In one embodiment, DSDx functionality (either DSDA or DSDS functionality) may be implemented with a single smart card (e.g., a eUICC) that executes multiple SIM applications for different carriers and/or RATs.

As noted above, the UE 106 may be configured to communicate wirelessly using multiple radio access technologies (RATs). As further noted above, in such instances, the cellular communication circuitry (radio(s)) 430 may include radio components which are shared between multiple RATS and/or radio components which are configured exclusively for use according to a single RAT. Where the UE 106 comprises at least two antennas, the antennas 435 and 436 may be configurable for implementing MIMO (multiple input multiple output) communication.

As described herein, the UE 106 may include hardware and software components for implementing features for communicating using two or more RATs, such as those described herein. The processor 402 of the UE device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the UE device 106, in conjunction with one or more of the other components 400, 404, 406, 410, 420, 430, 435, 440, 450, 460 may be configured to implement part or all of the features described herein.

Figure 5A:
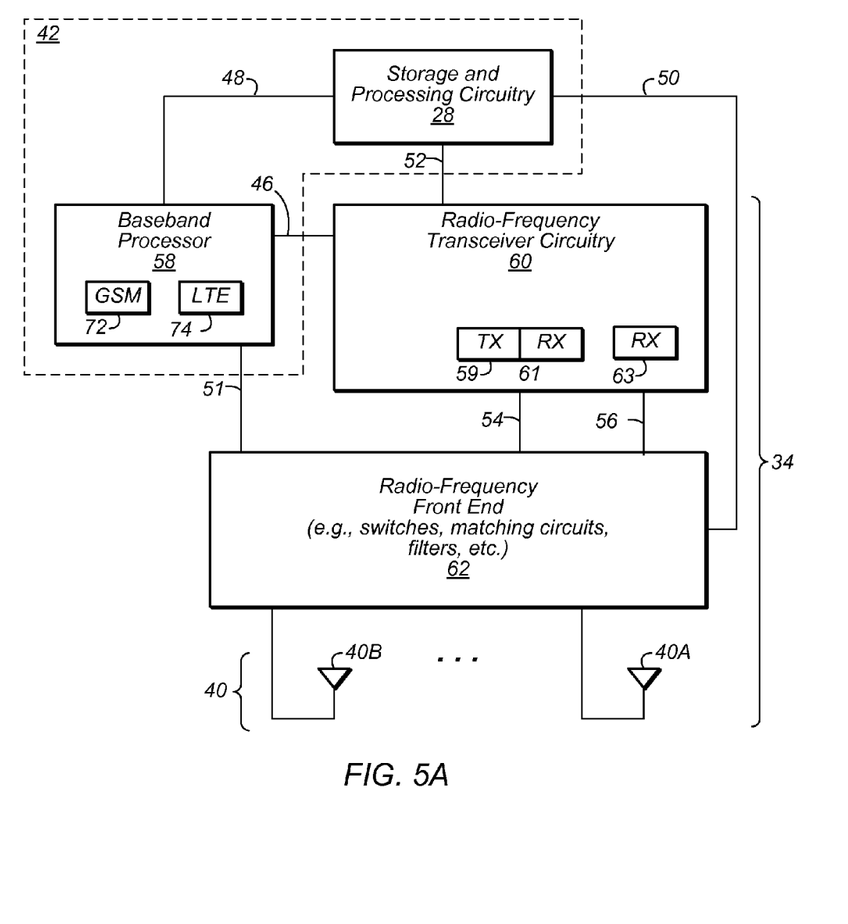
FIGS. 5A and 5B are example block diagrams of wireless communication circuitry in the UE, according to one embodiment.
Figure 5B:
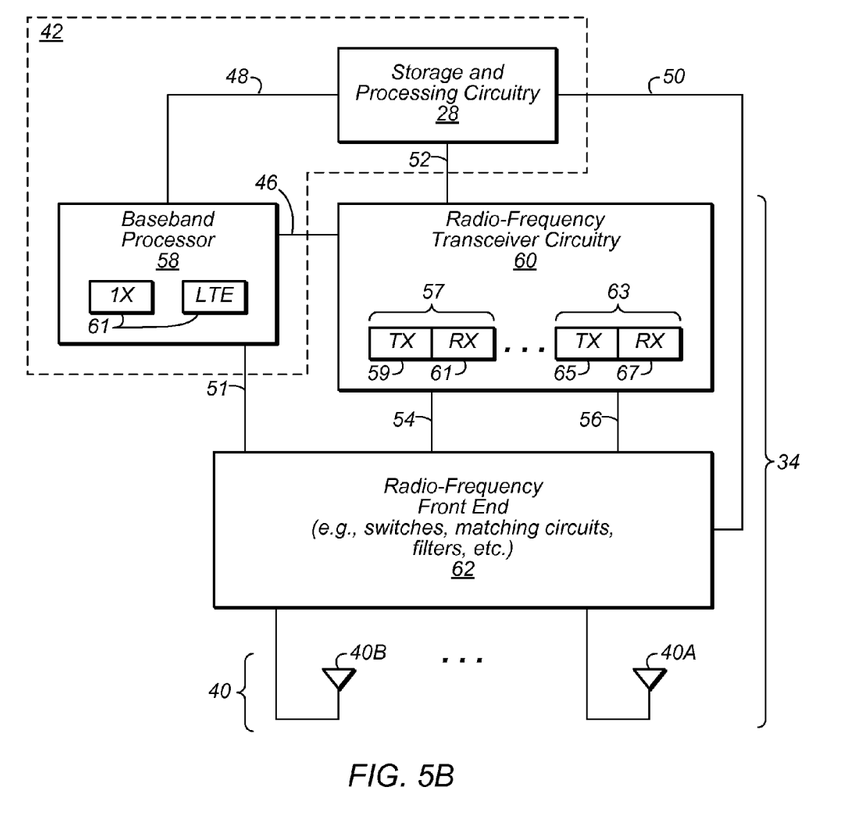

FIGS. 5A and 5B—UE Transmit/Receive Logic

FIG. 5A illustrates a portion of UE 106 according to one embodiment. As shown, UE 106 may comprise control circuitry 42 that is configured to store and execute control code for implementing control algorithms in the UE 106. Control circuitry 42 may include storage and processing circuitry 28 (e.g., a microprocessor, memory circuits, etc.) and may include baseband processor integrated circuit 58. Baseband processor 58 may form part of wireless circuitry 34 and may include memory and processing circuits (i.e., baseband processor 58 may be considered to form part of the storage and processing circuitry of UE 106). Baseband processor 58 may comprise software and/or logic for handling various different RATs, such as GSM logic 72 and LTE logic 74, among others.

Baseband processor 58 may provide data to storage and processing circuitry 28 (e.g., a microprocessor, nonvolatile memory, volatile memory, other control circuits, etc.) via path 48. The data on path 48 may include raw and processed data associated with UE cellular communications and operations, such as cellular communication data, wireless (antenna) performance metrics for received signals, information related to tune-away operations, information related to paging operations, etc. This information may be analyzed by storage and processing circuitry 28 and/or processor 58 and, in response, storage and processing circuitry 28 (or, if desired, baseband processor 58) may issue control commands for controlling wireless circuitry 34. For example, storage and processing circuitry 28 may issue control commands on path 52 and path 50 and/or baseband processor 58 may issue commands on path 46 and path 51.

Wireless circuitry 34 may include radio-frequency transceiver circuitry such as radio-frequency transceiver circuitry 60 and radio-frequency front-end circuitry 62. Radio-frequency transceiver circuitry 60 may include one or more radio-frequency transceivers. In the embodiment shown radio-frequency transceiver circuitry 60 comprises transceiver (TX) chain 59, receiver (RX) chain 61 and RX chain 63. As noted above, the two RX chains 61 and 63 may be a primary RX chain 61 and a diversity RX chain 63. The two RX chains 61 and 63 may be connected to the same local oscillator (LO) and thus may operate together at the same frequency for MIMO operations. Thus the TX chain 59 and the two RX chains 61 and 63 may be considered, along with other necessary circuitry, as a single radio. Other embodiments are of course contemplated. For example, the radio-frequency transceiver circuitry 60 may comprise only a single TX chain and only a single RX chain, also a single radio embodiment. Thus the term "radio" may be defined to have the broadest scope of its ordinary and accepted meaning, and comprises the circuitry normally found in a radio, including either a single TX chain and a single RX chain or a single TX chain and two (or more) RX chains, e.g., connected to the same LO. The term radio may encompass the transmit and receive chains discussed above and may also include digital signal processing coupled to the radio frequency circuitry (e.g., the transmit and receive chains) associated with performing wireless communication. As one example, the transmit chain may include such components as amplifier, mixer, filter, and digital analog converter. Similarly, the receive chain(s) may include, e.g., such components as amplifier, mixer, filter, and analog to digital converter. As mentioned above, multiple receive chains may share a LO, although in other embodiments, they may comprise their own LO. Wireless communication circuitry may encompass a larger set of components, e.g., including one or more radios of the UE (transmit/receive chains and/or digital signal processing), baseband processors, etc. The term "cellular wireless communication circuitry" includes various circuitry for performing cellular communication, e.g., as opposed to other protocols that are not cellular in nature, such as Bluetooth. Certain embodiments of the invention described herein may operate to improve performance when a single radio (i.e., a radio with a single TX chain and single RX chain; or a radio with a single TX chain and two RX chains, where the two RX chains are connected to the same LO) supports multiple RATs.

As shown in FIG. 5B, the radio-frequency transceiver circuitry 60 may also comprise two or more TX chains and two or more RX chains. For example, FIG. 5B shows an embodiment with a first radio 57 comprising TX chain 59 and RX chain 61 and a second radio 63 comprising a first TX chain 65 and a second TX chain 67. Embodiments are also contemplated where additional TX/RX receive chains may be included in the embodiment of FIG. 5A, i.e., in addition to the one TX chain 59 and two RX chains 61 and 63 shown. In these embodiments that have multiple TX and RX chains, when only one radio is currently active, e.g., the second radio is turned off to save power, certain embodiments of the invention described herein may operate to improve performance of the single active radio when it supports multiple RATs.

Baseband processor 58 may receive digital data that is to be transmitted from storage and processing circuitry 28 and may use path 46 and radio-frequency transceiver circuitry 60 to transmit corresponding radio-frequency signals. Radio-frequency front end 62 may be coupled between radio-frequency transceiver 60 and antennas 40 and may be used to convey the radio-frequency signals that are produced by radio-frequency transceiver circuitry 60 to antennas 40. Radio-frequency front end 62 may include radio-frequency switches, impedance matching circuits, filters, and other circuitry for forming an interface between antennas 40 and radio-frequency transceiver 60.

Incoming radio-frequency signals that are received by antennas 40 may be provided to baseband processor 58 via radio-frequency front end 62, paths such as paths 54 and 56, receiver circuitry in radio-frequency transceiver 60, and paths such as path 46. Path 54 may, for example, be used in handling signals associated with transceiver 57, whereas path 56 may be used in handling signals associated with transceiver 63. Baseband processor 58 may convert received signals into digital data that is provided to storage and processing circuitry 28. Baseband processor 58 may also extract information from received signals that is indicative of signal quality for the channel to which the transceiver is currently tuned. For example, baseband processor 58 and/or other circuitry in control circuitry 42 may analyze received signals to produce various measurements, such as bit error rate measurements, measurements on the amount of power associated with incoming wireless signals, strength indicator (RSSI) information, received signal code power (RSCP) information, reference symbol received power (RSRP) information, signal-to-interference ratio (SINR) information, signal-to-noise ratio (SNR) information, channel quality measurements based on signal quality data such as Ec/Io or Ec/No data, etc.

Radio-frequency front end 62 may include switching circuitry. The switching circuitry may be configured by control signals received from control circuitry 42 (e.g., control signals from storage and processing circuitry 28 via path 50 and/or control signals from baseband processor 58 via path 51). The switching circuitry may include a switch (switch circuit) that is used to connect TX and RX chain(s) to antennas 40A and 40B. Radio-frequency transceiver circuitry 60 may be configured by control signals received from storage and processing circuitry over path 52 and/or control signals received from baseband processor 58 over path 46.

The number of antennas that are used may depend on the operating mode for UE 106. For example, as shown in FIG. 5A, in normal LTE operations, antennas 40A and 40B may be used with respective receivers 61 and 63 to implement a receive diversity scheme, such as for MIMO operations. With this type of arrangement, two LTE data streams may be simultaneously received and processed using baseband processor 58. When it is desired to monitor a GSM paging channel for incoming GSM pages, one or both of the antennas may be temporarily used in receiving GSM paging channel signals.

Control circuitry 42 may be used to execute software for handling more than one radio access technology. For example, baseband processor 58 may include memory and control circuitry for implementing multiple protocol stacks such as a GSM protocol stack 72 and an LTE protocol stack 74. Thus, protocol stack 72 may be associated with a first radio access technology such as GSM (as an example), and protocol stack 74 may be associated with a second radio access technology such as LTE (as an example). During operation, UE 106 may use GSM protocol stack 72 to handle GSM functions and may use LTE protocol stack 74 to handle LTE functions. Additional protocol stacks, additional transceivers, additional antennas 40, and other additional hardware and/or software may be used in UE 106 if desired. The arrangement of FIGS. 5A and 5B is merely illustrative. In one embodiment, one or both of the protocol stacks may be configured to implement the methods described in the flowcharts below.

In one embodiment of FIG. 5A (or 5B), the cost and complexity of UE 106 may be minimized by implementing the wireless circuitry of FIG. 5A (or 5B) using an arrangement in which baseband processor 58 and radio-transceiver circuitry 60 are used to support both LTE and GSM traffic.

The GSM radio access technology may generally be used to carry voice traffic, whereas the LTE radio access technology may generally be used to carry data traffic. To ensure that GSM voice calls are not interrupted due to LTE data traffic, GSM operations may take priority over LTE operations. To ensure that operations such as monitoring a GSM paging channel for incoming paging signals do not unnecessarily disrupt LTE operations, control circuitry 42 can, whenever possible, configure the wireless circuitry of UE 106 so that wireless resources are shared between LTE and GSM functions.

When a user has an incoming GSM call, the GSM network may send UE 106 a paging signal (sometimes referred to as a page) on the GSM paging channel using base station 102. When UE 106 detects an incoming page, UE 106 can take suitable actions (e.g., call establishment procedures) to set up and receive the incoming GSM call. Pages are typically sent several times at fixed intervals by the network, so that devices such as UE 106 will have multiple opportunities to successfully receive a page.

Proper GSM page reception may require that the wireless circuitry of UE 106 be periodically tuned to the GSM paging channel, referred to as a tune-away operation. If the transceiver circuitry 60 fails to tune to the GSM paging channel or if the GSM protocol stack 72 in baseband processor 58 fails to monitor the paging channel for incoming pages, GSM pages will be missed. On the other hand, excessive monitoring of the GSM paging channel may have an adverse impact on an active LTE data session. Embodiments of the invention may comprise improved methods for handling tune-away operations, as described below.

In some embodiments, in order for the UE 106 to conserve power, the GSM and LTE protocol stacks 72 and 74 may support idle mode operations. Also, one or both of the protocol stacks 72 and 74 may support a discontinuous reception (DRX) mode and/or a connected discontinuous reception (CDRX) mode. DRX mode refers to a mode which powers down at least a portion of UE circuitry when there is no data (or voice) to be received. In DRX and CRDX modes, the UE 106 synchronizes with the base station 102 and wakes up at specified times or intervals to listen to the network. DRX is present in several wireless standards such as UMTS, LTE (Long-term evolution), WiMAX, etc. The terms "idle mode", "DRX" and "CDRX" are explicitly intended to at least include the full extent of their ordinary meaning, and are intended to encompass similar types of modes in future standards.

Performing Data Communication of a First RAT During a Voice Call of a Second RAT As discussed above, a UE may use a single radio to communicate using two different RATs. For example, the UE may use a single radio to communicate using a first RAT and may periodically tune away in order to perform various actions for a second RAT, such as page decoding. In this example, the UE may be considered as maintaining a connection to both RATs using the same radio, even though it may only communicate using one RAT at a time. In one embodiment, the first RAT may be LTE and the second RAT may be GSM, although other combinations of RATs are envisioned.

In order to support both first RAT (e.g., LTE) and second RAT (e.g., GSM or CDMA, among other possibilities) using a single radio, the UE may fully camp on the first RAT and switch to the second RAT when making a MO (mobile originated) voice call, or when receiving page from the first RAT for a second RAT MT (mobile terminated) call, and switch to the second RAT to initiate the second RAT MT call setup. During the second RAT voice call, the UE may be fully on GSM NW, and either not able to perform data communication, or perform only slow data rate if using dual transfer mode (DTM), although DTM may not be supported by all networks, such as China Mobile CC.

Similarly, the UE may initially simultaneously camp on both the first RAT and the second RAT using time-sharing of a single radio. Upon MO call initiation or receiving a page on the second RAT for a second RAT MT voice call, the first RAT may be suspended to give full radio control for the second RAT voice call. In this case, data communication of the first RAT may not be possible. Thus, both of these approaches may not be desirable.

As another possibility, the UE may use two radios, e.g., a first radio for the first RAT and a second radio for the second RAT. However, utilizing two radios has big power impact. For example, where the second RAT is GSM, the high frequency of GSM DRX wakeup which is typically configured as GSM 470 ms may result in much higher power use. For example, GSM standby time may be 210 hours (DRX cycle of 470 ms) as compared to 300 hours for LTE (DRX cycle of 1.28 s).

Accordingly, the UE may use a single radio for performing data communication on a first RAT while performing a voice call on a second RAT. In the following, the first RAT is described as LTE and the second RAT is described as GSM; however, other embodiments are envisioned with any combination of desired RATs. For example, the following descriptions may also apply to the case where the first RAT is LTE and the second RAT is CDMA (or some version thereof), as desired.

In one embodiment, the UE may fully camp on an LTE network that supports circuit switched fall back (CSFB), thereby avoiding camping on both LTE and GSM, e.g., and thus allowing for a combined attach to LTE and GSM network supporting CSFB. In this embodiment, the power use of the UE may be lower since the UE may only be camped on LTE, which has LTE idle DRX cycles of 1.28 ms, rather than having to simultaneously handle both the LTE DRX cycles and the GSM DRX cycles which are more frequent, e.g., 470 ms.

Accordingly, when GSM a MO voice call is initiated or LTE receives LTE page for a GSM MT call, UE may initiate an LTE and GSM shared mode to share the single radio. During a GSM voice call, a GSM voice block uses four GSM frames, one slot in each GSM frame. The following techniques and scenarios may allow for LTE usage of the radio during the voice call, e.g., resulting from causing the GSM voice call to not fully use all four GSM frames, and thereby leaving a gap for LTE to use the radio. For example, each GSM frames has 8 slots, but GSM only uses one slot for performing the voice call. Accordingly, one or more or all of the remaining 7 slots may be used for LTE data communication.

Additionally, during a voice call, human voice talk generally always has stops and starts, so GSM voice channel can do DTX, DRX during the call, allowing for LTE to use the gaps for data communication.

Further, it may be possible to artificially cut one GSM voice block to use less GSM frames (e.g., three frames instead of four), due to voice redundant channel code. For example, the transmitted GSM frame power may be increased, resulting in higher SNR that can compensate the data lost in the GSM frames that are cut. For example, a frame used for GSM voice redundancy may be avoided by using higher power, giving higher SNR and reducing the need for the voice redundancy. Accordingly, another GSM frame may be available for LTE data usage. This effect may be applied dynamically, e.g., based on current channel conditions (e.g., comparing the current SNR to a threshold to determine if one or more of the GSM voice frames can be used for LTE).

Thus, from the LTE side, due to the above-mentioned GSM voice channel TX/RX reduction, LTE can get multiple instances of radio control periodically every 26 GSM frames. Accordingly, LTE can use these idle spaces released from the GSM voice call for LTE TX and RX. Even though LTE data throughput may potentially reduce, e.g., 50% from theoretical value, because of its high LTE speed, for example 20-30 Mbps on a typical live network, it is still far more usable and faster than GSM EDGE or TDSCDMA and provides a much better user experience. This better user experience applies even more so in instances where data communication was previously not possible during the voice call.

Figure 6:
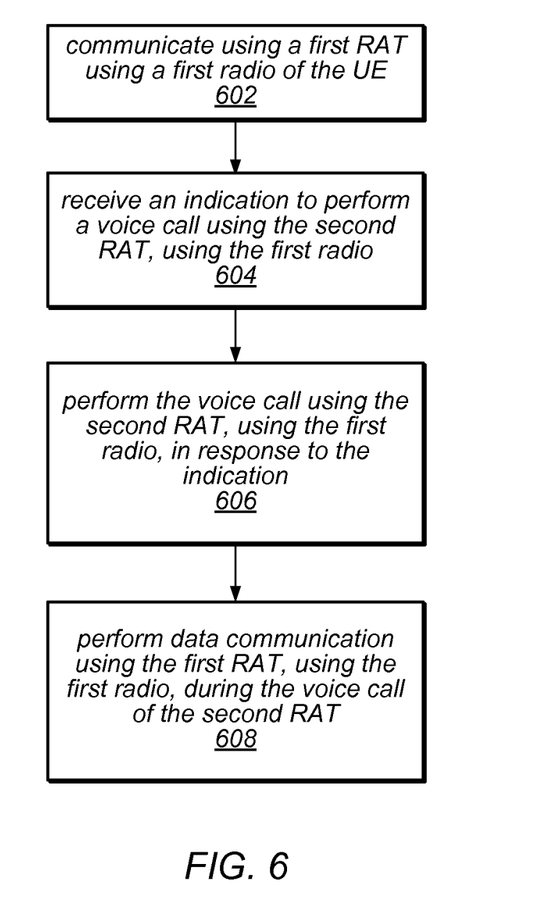
FIG. 6 is a flowchart diagram illustrating an exemplary method for performing data communication using a first RAT while performing a voice call using a second RAT using a first radio.

FIG. 6—Performing Data Communication of a First RAT During a Voice Call of a Second RAT FIG. 6 is a flowchart diagram illustrating a method for performing data communication using a first RAT during a voice call using a second RAT. The UE device (such as UE 106) may use a first radio for both the first RAT and the second RAT. The method shown in FIG. 6 may be used in conjunction with any of the systems or devices shown in the above Figures, among other devices. In various embodiments, some of the method elements shown may be performed concurrently, in a different order than shown, or may be omitted. Note also that additional method elements may also be performed as desired. The method may be performed as follows.

As shown, in 602, the UE may communicate using the first radio using the first RAT. In one embodiment, the first RAT may be LTE, although other RATs are envisioned. Additionally, the second RAT may be GSM or CDMA. However, other combinations of RATs are also envisioned. In some embodiments, the UE may only have a single radio for performing cellular communication. Alternatively, the UE may include multiple radios for performing cellular communication, e.g., and may periodically only use of the radios, e.g., in the manner described regarding FIG. 6. Furthermore, the UE may include a smart card that implements SIM functionality for both the first RAT and the second RAT shown in FIG. 6. The UE may include additional smart cards having SIM functionality, if desired; however, in one embodiment, the UE may only include a single smart card implementing SIM functionality.

In 602, the UE may generally not maintain a connection using the second RAT. For example, the first RAT may support circuit switched fall back (CSFB) for voice calls of the second RAT. Accordingly, the UE may not need to use the first radio to maintain a connection to both the first RAT and the second RAT, and may generally simply camp on the first RAT. Thus, in 602, the UE may perform communication using the first RAT (e.g., data communication) and may generally not communicate using the second RAT during this time.

However, from time to time, the UE may ensure that it is aware of appropriate base stations for the second RAT, e.g., in the event that a voice call is initiated for the second RAT. Accordingly, the UE may periodically determine an appropriate base station for performing communication using the second RAT, e.g., for a voice call that may occur in the future. However, the UE may still not maintain a connection with the second RAT, even when performing these periodic checks.

In 604, the UE may receive an indication to perform a voice call using the second RAT. For example, in one embodiment, the UE may receive a request (e.g., a page) from the first RAT indicating a mobile terminated voice call for the second RAT. Alternatively, the UE may receive a request for a mobile originated voice call for the second RAT (e.g., in response to the user providing input to make a voice call to another device).

In 606, in response to the indication, the UE may perform the voice call using the second RAT. For example, the UE may tune the first radio to the second RAT and initiate voice call procedures to perform the voice call using the second RAT.

Additionally, in 608, the UE may perform data communication using the first RAT during the voice call using the second RAT.

For example, the UE may have been in a single RAT mode (using the radio for the first RAT), e.g., in 602, and may enter a dual RAT mode (using the first radio for both the first RAT and the second RAT) in response to receiving the indication in 604. Thus, in response to the indication in 604, the UE may share the first radio to perform the voice call of the second RAT and data communication of the first RAT, thereby allowing the user to have data and voice capability using the same first radio.

Because of this shared mode, the UE may not transmit an extended service request (ESR) to the first RAT in response to the indication, as would normally be done. Instead, as discussed above, the UE may maintain the connection to the first RAT in order to perform data communication during the voice call of the second RAT.

The UE may perform a variety of actions in order to perform data communication using the first RAT while performing the voice call using the second RAT, using the same, first radio. For example, the second RAT may specify a plurality of structures (e.g., frames or slots) that are used for the voice call, and the UE may perform data communication for the first RAT using a subset of these frames or slots. For example, the second RAT may assign a voice block using one or more frames (e.g., four frames) for the voice call. The first RAT may attempt to communicate during these frames.

Within each frame, only a certain number of slots may be used for the voice call. For example, only a single slot of the frame may be used for the voice call (e.g., where other calls use the other slots). Accordingly, the first radio may be sued for first RAT communication during these other slots, as desired. Note that embodiments where more than one slot is used for the voice call are also envisioned.

Additionally, during the voice call, there may be a great deal of starts and stops of voice audio. Accordingly, the first RAT may use the radio during these periods of silence, e.g., perform DTX/DRX during the call.

The voice call may also use redundant channel coding for the voice call (e.g., voice redundant channel coding) of the second RAT. If the channel quality of the second RAT is sufficient, this additional coding may not be necessary, and an extra frame or portion of the voice block may be used for the first RAT data communication. For example, if four frames are used for the voice call, one of the frames may be freed up for performing data communication of the first RAT under appropriate channel conditions. In some embodiments, the use of these extra frame(s) or structures may be based on a threshold, e.g., if the channel quality (e.g., the SNR) is above the threshold, the additional frame(s) may be used for the data communication of the first RAT; however, if it is below the threshold, the additional frame(s) may not be used for the first RAT.

In some embodiments, the SNR may be increased by increasing the power of the frame power of the second RAT (e.g., for the voice call). Using this extra power may allow for the use of less frames for the voice call (e.g., by removing the need to perform the redundant voice coding). Note that this embodiment may be used in addition to or alternatively from the threshold embodiment discussed above.

Other methods for interjecting first RAT data communication into the second RAT voice call, using the same, first radio, are envisioned.

While FIG. 6 is described as pertaining to embodiments where the UE does not maintain a connection to both the first RAT and the second RAT using the first radio, it may also apply to such scenarios. For example, the UE may initially be in a dual RAT mode where the first radio is used to maintain a connection to the first RAT and the second RAT. Accordingly, when an indication of a voice call is used, it may remain in the dual RAT mode and may operate to perform first RAT data communication during the second RAT voice call, e.g., as discussed above. Thus, the descriptions of FIG. 6 also pertain to situations where the UE is in dual RAT mode and/or maintains a connection to both the first RAT and the second RAT prior to receiving the indication of the voice call for the second RAT.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
   at a user equipment device (UE) comprising a first radio, wherein the first radio comprises one or more receive chains, where the one or more receive chains operate on the same frequency, and wherein the first radio is configurable to communicate using a first radio access technology (RAT) and a second RAT:
      performing, using the first radio, first data communication using the first RAT, wherein the first RAT comprises long term evolution (LTE), wherein during said performing first data communication the UE is not communicating using the second RAT, wherein the UE comprises a single SIM for the first RAT and the second RAT;
      receiving an indication to perform at least one of a mobile originated voice call or receive a mobile terminated voice call using the second RAT;
      performing, using the first radio, the voice call using the second RAT in response to the indication;
      performing, using the first radio, second data communication using the first RAT during said performing the voice call, wherein the second data communication involves transmission and reception using the first radio, and wherein the one or more receive chains time multiplex among the first and second RATs;
      wherein, based on the UE performing the second data communication during the voice call, the UE is configured to perform the voice call using the second RAT using fewer frames at an increased power, and wherein performing the voice call using fewer frames at the increased power allows the UE to use an additional frame of the second RAT for performing the second data communication.

2. The method of claim 1, wherein said receiving the indication comprises receiving a mobile terminated request for a mobile terminated voice call from the second RAT, wherein the indication is received using the first RAT.

3. The method of claim 1, wherein the indication is for a mobile originated voice call, and wherein the indication comprises user input to the UE to perform the voice call.

4. The method of claim 1, wherein the first RAT supports circuit switched fall back.

5. The method of claim 1, where the UE does not transmit an extended service request (ESR) to the first RAT in response to the indication.

6. The method of claim 1, further comprising:
   while connected to the first RAT, periodically tuning the first radio to a frequency of the second RAT to determine a base station for the second RAT.

7. The method of claim 1, wherein the radio is in a single radio mode during said performing first data communication, the method further comprising:
   the UE entering a shared radio mode in response to the indication, wherein in the shared radio mode the radio of the UE is configured use the first radio to communicate using both the first RAT and the second RAT, wherein said performing the voice call and said performing the second data communication are conducted in the shared radio mode.

8. The method of claim 1, wherein the second RAT specifies a plurality of structures that are used for a voice call, wherein the UE performing data communications using the first RAT comprises performing data communications using the first RAT on at least a subset of the plurality of structures specified for use during the voice call on the second RAT.

9. The method of claim 1, wherein performing the voice call using the second RAT uses a first one or more slots in a frame, wherein performing the second data communication comprises performing a second one or more slots in the frame, wherein the first one or more slots are different from the second one or more slots.

10. The method of claim 1, wherein said performing the second data communication comprises performing the second data communication during silences of the voice call of the second RAT.

11. The method of claim 1, wherein the UE comprises a single radio for performing cellular communication, and wherein the first radio is the single radio.

12. The method of claim 1, wherein the second RAT comprises global system for mobile communications (GSM).

13. The method of claim 1, wherein the second RAT comprises a code division multiple access (CDMA) technology.

14. A user equipment device (UE), comprising:
   a first radio, wherein the first radio comprises one or more receive chains, where the one or more receive chains operate on the same frequency, and wherein the first radio is configured to perform communication using a first radio access technology (RAT) and a second RAT and maintain a connection to both the first RAT and the second RAT concurrently;
   a smart card, wherein the smart card is configured to implement subscriber identity module (SIM) functionality for both the first RAT and the second RAT; and
   one or more processors coupled to the first radio, wherein the one or more processors and the first radio are configured to:
      perform first data communication using the first RAT, wherein the first RAT comprises long term evolution (LTE);
      receive an indication to perform at least one of a mobile originated voice call or receive a mobile terminated voice call using the second RAT;
      perform the voice call using the second RAT in response to the indication;
      perform second data communication using the first RAT during performing the voice call, wherein the second data communication involves transmission and reception using the first radio, and wherein the one or more receive chains time multiplex among the first and second RATs;

wherein, based on the UE performing the second data communication during the voice call, the UE is configured to perform the voice call using the second RAT using fewer frames at an increased power, and wherein performing the voice call using fewer frames at the increased power allows the UE to use an additional frame of the second RAT for performing the second data communication.

15. The UE of claim 14, wherein receiving the indication comprises receiving a mobile terminated request for a mobile terminated voice call from the second RAT, wherein the indication is received using the second RAT.

16. The UE of claim 14, wherein the second RAT specifies voice blocks each having a plurality of frames that are used for a voice call, wherein the UE performing second data communication using the first RAT comprises performing data communication using the first RAT on at least a subset of frames specified for use during the voice call on the second RAT.

17. The UE of claim 14, wherein performing the voice call using the second RAT uses a first one or more slots in a frame, wherein performing the second data communication comprises performing a second one or more slots in the frame, wherein the first one or more slots are different from the second one or more slots.

18. A non-transitory, computer accessible memory medium storing program instructions for performing handover by a user equipment device (UE), wherein the UE comprises a first radio for communicating using a first radio access technology (RAT) and a second RAT, wherein the first radio comprises one or more receive chains, where the one or more receive chains operate on the same frequency, and wherein the program instructions are executable by a processor to:

perform, using the first radio, first data communication using the first RAT, wherein the first RAT comprises long term evolution (LTE);

receiving an indication of a voice call for the second RAT;

perform, using the first radio, the voice call using the second RAT in response to the indication; and perform, using the first radio, second data communication using the first RAT during said performing the voice call, wherein the second data communication involves transmission and reception using the first radio, and wherein the one or more receive chains time multiplex among the first and second RATs;

wherein, based on the UE performing the second data communication during the voice call, the UE is configured to perform the voice call using the second RAT using fewer frames at an increased power, and wherein performing the voice call using fewer frames at the increased power allows the UE to use an additional frame of the second RAT for performing the second data communication.

* * * * *